(12) United States Patent
Maltz et al.

(10) Patent No.: US 8,937,746 B2
(45) Date of Patent: Jan. 20, 2015

(54) COLOR CONVERSION FOR RENDERING DEVICES INVOLVING IMPROVED GAMUT MAPPING

(75) Inventors: Martin Sidney Maltz, Rochester, NY (US); James Michael Sanchez, Rochester, NY (US)

(73) Assignee: Xerox Corporation, Norwalk, CT (US)

(*) Notice: Subject to any disclaimer, the term of this patent is extended or adjusted under 35 U.S.C. 154(b) by 225 days.

(21) Appl. No.: 13/440,988

(22) Filed: Apr. 5, 2012

(65) Prior Publication Data
US 2013/0265593 A1 Oct. 10, 2013

(51) Int. Cl.
*G06F 15/00* (2006.01)
*G06K 9/00* (2006.01)
*G03G 15/01* (2006.01)

(52) U.S. Cl.
USPC .............. 358/1.9; 358/518; 382/162; 399/39

(58) Field of Classification Search
None
See application file for complete search history.

(56) References Cited

U.S. PATENT DOCUMENTS

| | | | | |
|---|---|---|---|---|
| 6,421,142 B1* | 7/2002 | Lin et al. | ........................ | 358/1.9 |
| 7,639,394 B2* | 12/2009 | Forbush et al. | ................ | 358/1.9 |
| 7,929,760 B2* | 4/2011 | Tamagawa | ..................... | 382/167 |
| 8,223,396 B2* | 7/2012 | Kishimoto | ..................... | 358/1.9 |
| 8,335,019 B2* | 12/2012 | Aihara | ......................... | 358/3.23 |

OTHER PUBLICATIONS

Balasubramanian et al., A Method for Quantifying the Color Gamut of an Output Device, Proc. SPIE, vol. 3018, pp. 110-116 (1997).
Fairchild, A Revision of CIECAM97s for Practical Applications, Color Research and Application, vol. 26, Issue 6, pp. 418-427 (Dec. 2001).
Stone et al., A Field Guide to Digital Color, Course 21, SIGGRAPH 2002, 77 pages (Jul. 22, 2002).
Maltz et al., JAB to RBG Multidimensional Lookup Tables, Image Processing Workshop, pp. 34-37 (2010).

* cited by examiner

*Primary Examiner* — Steven Kau
(74) *Attorney, Agent, or Firm* — Anthony L. Miele

(57) ABSTRACT

In accordance with one aspect of the present disclosure, apparatus are provided that include a color data conversion subsystem configured to convert color data in order to produce device-dependent output color separation data. The color data conversion subsystem has been configured by gamut mapping including providing a gamut in a hue-based color space and applying color distance adjustments to the hue-based color space. A hue dependent lightness preservation operation can also be part of the subsystem.

19 Claims, 5 Drawing Sheets

COLOR CONVERSION FOR RENDERING DEVICES INVOLVING IMPROVED GAMUT MAPPING

FIELD OF THE DISCLOSURE

Aspects of the present disclosure relate to gamut mapping, and to color conversion subsystems, e.g., color lookup tables and B2A tags incorporating such color lookup tables.

BACKGROUND

When reproducing color with a rendering device, e.g., a display or a printer, the rendering device has inherent limitations in terms of the colors it can produce and a unique gamut, i.e., a unique set of colors that can be reproduced by the rendering device. Accordingly, when a given image is specified with input color separation data (e.g., CMYK data configured for an offset press) not directly compatible with the rendering device's gamut (e.g., requiring CMYK data for a particular type of printer), it must be converted using a color data conversion subsystem (e.g., a set of B2A tags incorporating respective color lookup tables). This color data conversion subsystem ideally will produce output color separation data causing the best reproduction of the image's colors, best portraying hue, color differences, and a number of other aspects of the image's colors.

SUMMARY

In accordance with one aspect of the present disclosure, apparatus are provided that include a color data conversion subsystem configured to convert color data in order to produce device-dependent output color separation data. The color data conversion subsystem has been configured by gamut mapping including providing a gamut in a hue-based color space and applying color distance adjustments to the hue-based color space.

BRIEF DESCRIPTION OF THE DRAWINGS

Embodiments of the disclosure are further described in the detailed description which follows, by reference to the noted drawings, in which like reference numerals represents similar parts throughout the several views of the drawings, and wherein.

DETAILED DESCRIPTION

Figure 1:
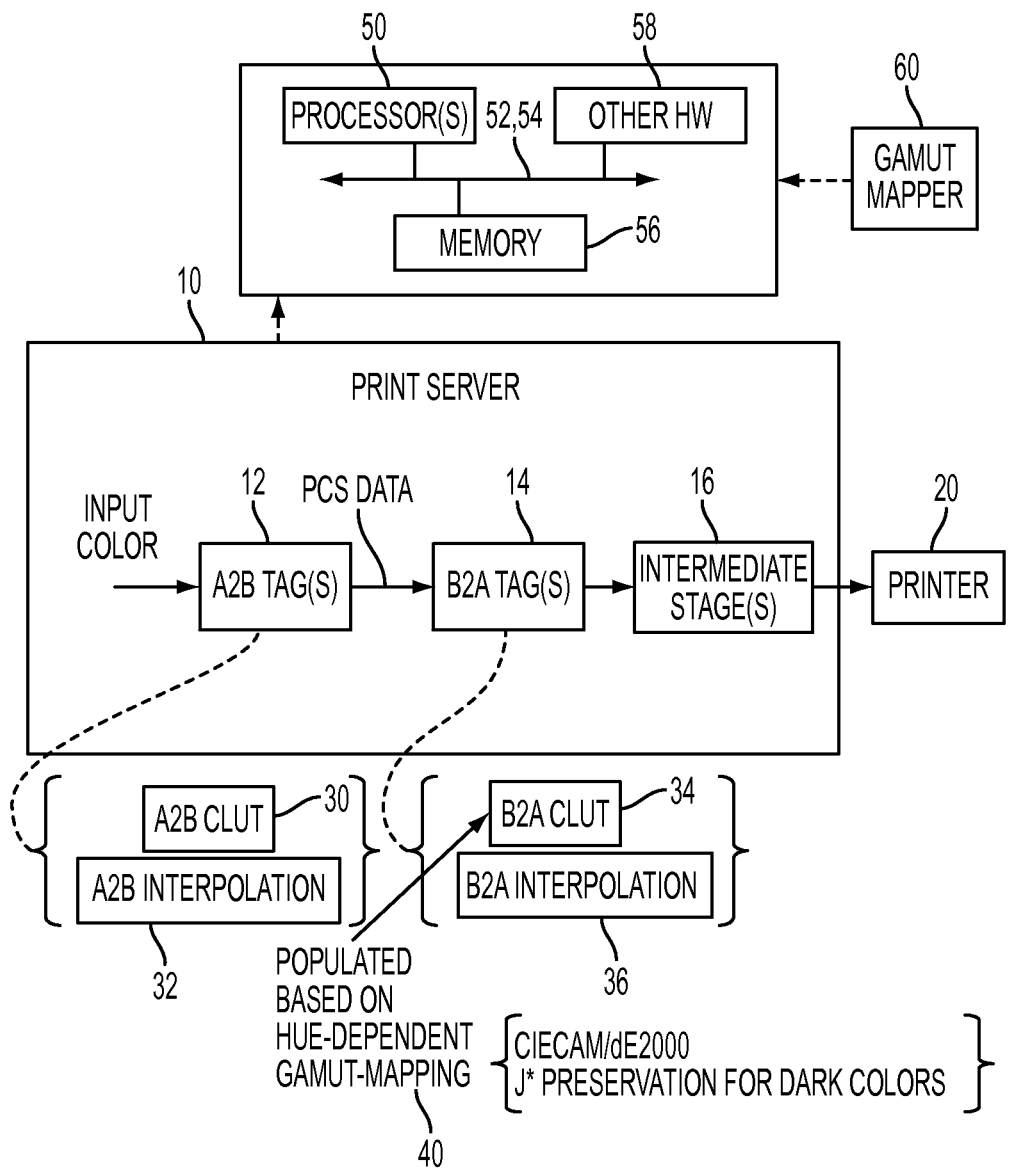
FIG. 1 is a block diagram of one embodiment of a color conversion and rendering system.

Aspects of the disclosure are directed to a color conversion and/or rendering system, subsystem, or method, or any part or combination thereof. FIG. 1 shows a color data conversion and rendering system including a color conversion subsystem 10 connected to a rendering device 20. In the illustrated embodiment, subsystem 10 includes a print server, and rendering device 20 includes a printer. The color conversion subsystem is configured to convert input color data of an image in order to produce device dependent output color separation data tailored to given target rendering media (of printer 20 in the embodiment). The color data conversion subsystem has been configured by gamut mapping 40, including providing a gamut in a hue-based color space and applying color distance adjustments to the hue-based color space.

The conversion and resulting production of device-dependent output color separation data may be direct, or indirect via one or more intermediate stages 16. In the embodiment shown, the hue-based color space is CIECAM J*a*b* space.

The CIECAM space is a well-known hue-based (or hue-corrected) space. Its coordinates are J* (lightness) a* (magentaness) and b* (yellowness). In CIECAM space, a line extending from the neutral axis to more chromatic colors is a line of constant perceived hue. This is not true for other common spaces. L*a*b* for example, is quite bad in the blue. Unlike the CIELAB, CIELUV, or Munsell spaces, CIECAM does not provide a uniform spatial representation of color differences.

DE2000 is a distance metric which correlates well with perceptual distances, but it does not preserve hue. In one embodiment herein, it was surprisingly found that a good compromise between these two competing requirements for a gamut mapping algorithm (maintain perceptual hue and minimize perceptual distance) can be achieved by converting to J*a*b* space and then using these values in the DE2000 distance formula as if they were L*a*b*. Accordingly, the above-mentioned adjustments to color distance may involve using the hue-based color space values (J*a*b* values in the illustrated embodiment) in dE2000 distance calculations, e.g., in the dE2000 distance formula as if J*a*b* values were L*a*b* values conventionally used in the formula.

Software for calculating the dE2000 formula may be used, e.g., as provided by MATLAB®.

Referring to FIG. 1 in more detail, a print server 10 and one or more printers 20 may be provided. As shown, print server 10 may include one or more A2B tags 12, one or more B2A tags 14, and (optionally) one or more interim stages 16. A2B tag(s) 12 include input(s) for receiving input color data and output(s) for outputting profile connection space (PCS) data. The PCS data is then input to B2A tag(s) 14, which outputs device dependent color data tailored to the target media, i.e., printer 20 in the embodiment. In the illustrated embodiment, the PCS data includes L*a*b CIELAB color space data.

The apparatus illustrated in FIG. 1 may include, e.g., one or more (collocated or distributed) processors 50, a data signaling structure (including a bus structure 52 and/or network connections 54), and memory 56, collectively configured to form a gamut mapper 60 and/or print server 10 formed based on gamut mapping by a gamut mapper.

The memory and processor structures are configured, e.g., with compiled code to hold stored representations of input color separation data for an image to be rendered. The input color separation data may be configured for given rendering media that is not the target rendering media. For example, the input color separation data may be CMYK data for some device, e.g., an offset press. The memory and processor structures may be further configured to hold stored representations of device dependent output color separation data for the image. Specifically, this data may be configured for the target rendering media, e.g., for a rendering engine. The data may be, e.g., CMYK tailored for a given print engine of printer 20, which is part of and connected to the apparatus shown in FIG. 1.

The illustrated color data conversion subsystem may include early and later stages, an early stage including the set of A2B tags 12, and a later stage including the set of B2A tags 14. One or more stages (not shown) may be interposed before or between such stages. Each set of tags as shown may include one or more tags. For example, when a set includes plural tags, separate tags may be provided for different types of color or image data, including as one example, different tags for pictures, graphics, and vivid color. In the embodiment shown in FIG. 1, B2A tag set 14 is in tandem with and downstream from A2B tag set 12.

As shown in FIG. 1, each A2B tag 12 includes at least one A2B CLUT (color lookup table) 30 and corresponding A2B interpolation engine 32, and each B2A tag 14 includes at least one B2A CLUT 34 and corresponding B2A interpolation engine 36.

Any given engine or tool referred to herein or any functionality referred to herein may be implemented with one or more processing circuits. For example, a processing circuit, or a processing mechanism, may include both (at least a portion of) non-transitory computer-readable media carrying functional encoded data and components of an active computer. The active computer is ready to execute (or is already executing) the functional encoded data, and thereby causes certain acts to occur. A processing circuit may also include: a machine or part of a machine that is specially configured to carry out a process, e.g., any process described herein; or a special purpose computer or a part of a special purpose computer. A processing circuit may also be in the form of a general purpose computer running a compiled, interpretable, or compilable program (or part of such a program) that is combined with hardware carrying out a process or a set of processes. A processing circuit may further be implemented in the form of an application specific integrated circuit (ASIC), part of an ASIC, or a group of ASICs. A processing circuit may further include an electronic circuit or part of an electronic circuit. Neither a processing circuit nor a processing mechanism exists in the form of code per se, software per se, instructions per se, mental thoughts alone, or processes that are carried out manually by a person without any involvement of a machine.

Many images from cameras, monitors, and some proofing systems have colors that cannot be reproduced by an available printer. Such colors have to be mapped to the gamut of the printer in a way that optimizes the quality of the resulting images.

Good gamut mapping algorithms generally satisfy several mutually conflicting requirements. Two key ones are that it should preserve perceptual hue, and should pick a color that is perceptually close to the unprintable one. In order to preserve hue, it is useful to work in a color space where any line from the neutral axis to more chromatic colors is a line of constant perceptual hue. Then hue can be preserved by geometrical construction. CIECAM (J*a*b*) is such a space; L*a*b* is not. However Euclidian distances in CIECAM do not agree with perceptual distances.

DE2000 is a metric that gives distances that agree with perceptual judgments. However it does not preserve hue. Therefore it would be desirable to combine the DE2000 and CIECAM algorithms, and several approaches have been suggested in the literature. The present disclosure presents a new way of doing this that seems to give superior results. First, all the colors to be gamut mapped are converted to CIECAM space. Next, the DE2000 metric is applied to the J*a*b* coordinates of the original color and the colors on the surface of the gamut, and the color on the surface of the gamut with the smallest DE2000 distance is chosen. In doing this, the CIECAM J*a*b* values are treated as if they were L*a*b* values, and they are plugged directly into the DE2000 formulas.

Using this approach solves several problems produced by previous gamut mapping algorithms. The most serious ones are associated with the magenta edge of the printer gamut. Adding cyan in this region of color space rapidly darkens the color. This converts small hue excursions in sky regions into large lightness excursions which make skies look mottled. It also converts some light pinks into dark purples. Eliminating these problems improves the quality of prints.

In some embodiments, to create an ICC profile using this technique, a calculation is done for all the nodes in the CLUT of the B2A tag. There are generally 33,000 or more such nodes for some printers, so to do the calculation in a reasonable amount of time, an efficient method is preferred for finding the color (the mapped color) on the surface of the gamut that is closest to an out of gamut color according to the computationally intensive DE2000 distance metric. This is basically a search problem, so per an embodiment of the present disclosure, a software architecture is presented that enables speedy searches.

Figure 2:
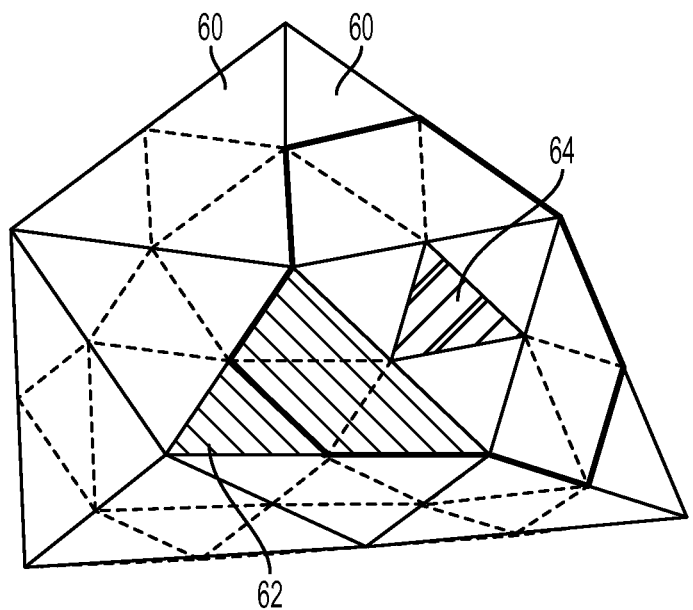
FIG. 2 is a graphical representation of a hue-based color space tessellated with triangles.

Accordingly, as shown in FIG. 2, in this architecture, a portion of the surface of the gamut (shown in simplified form) may be defined by a set of triangles 60 in J*a*b* space. In other words, FIG. 2 is a graphical representation of a hue-based color space tessellated with triangles 60—ten triangles 60 of which are viewable in FIG. 2. The triangles are software objects. For example, a given triangle may include a set of variables, whereby a compiler and linker may assign specific blocks of memory to hold the value of that variable. Each triangle in the illustrated embodiment has pointers to its own vertices (also software objects) and to adjacent triangles. The vertices also point to all the triangles that touch them.

Figure 4:
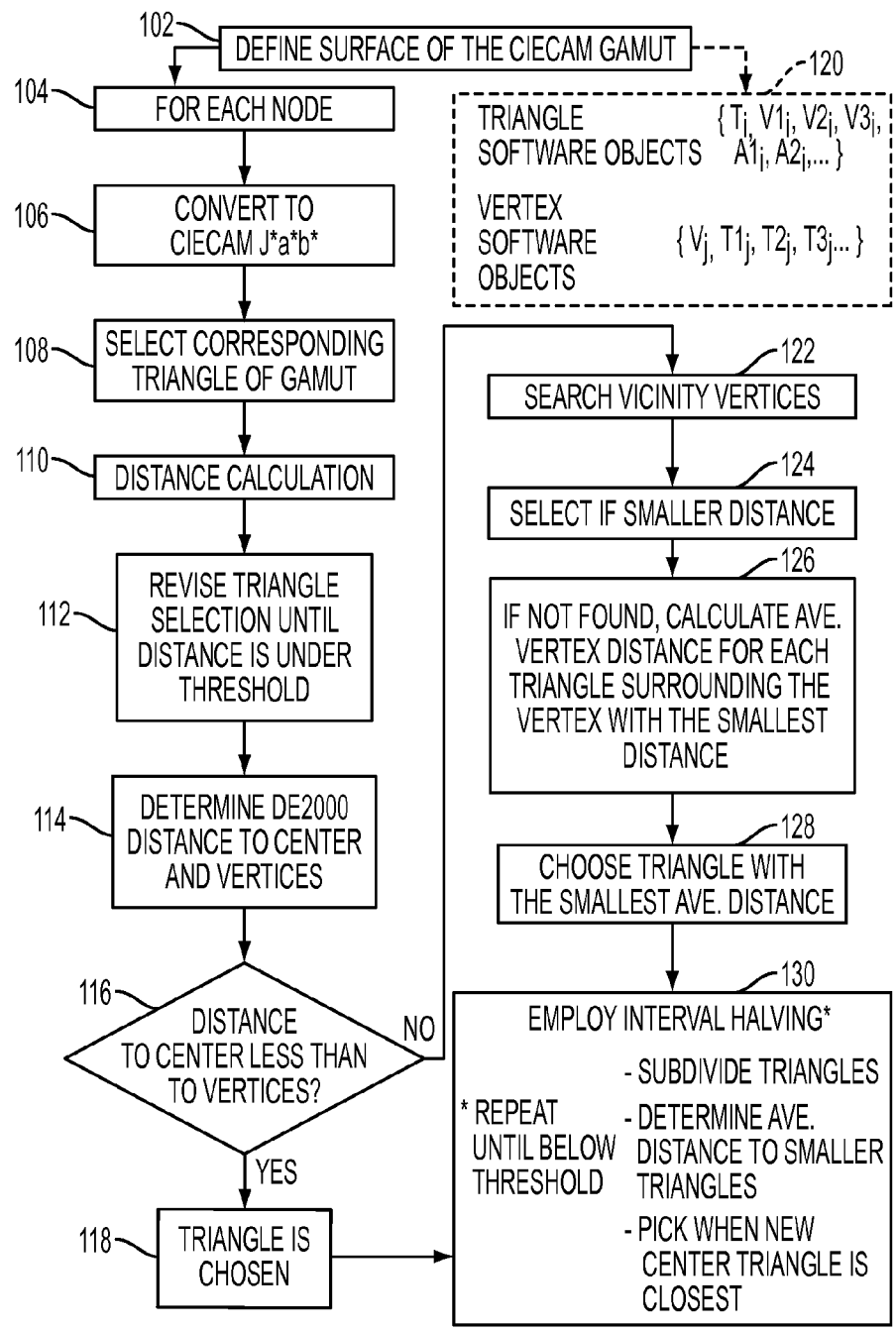
FIG. 4 is a flowchart of one embodiment of a process for performing a hue-based gamut mapping with color distance adjustments.

FIG. 4 is a flowchart of one embodiment of a process for performing a hue-based gamut mapping with color distance adjustments. In an early act 102, the surface of the CIECAM gamut for the printer is defined. Then, for each node of the CLUT to be formed, indicated at 104, a number of following acts are performed. Accordingly, in act 106, a given set of input values (generally, L*a*b* values) corresponding to the current node is converted to CIECAM J*a*b* values. When a B2A tag is later implemented with a CLUT formed with this gamut mapping, the possible range of J*a*b* values input to the B2A correspond to the gamut mapping nodes.

The process then looks for a region of the gamut surface that should contain the desired mapped color. Accordingly, in act 108, a triangle is chosen that might lie in the center of this region. It can use any one of a number of techniques to do this. It could use some other gamut mapping algorithm, or just use a triangle that gave a good result in a previous calculation for a nearby out of gamut node in the CLUT. In the illustrated embodiment, a distance calculation is performed at act 110 providing an estimation of the distance (e.g., in terms of cost) to the target region. Then, in act 112, we begin revising the selected triangle until the distance comes under a threshold.

In act 114, the DE2000 distance to the center and each vertex of the chosen triangle will be determined. Then, in act 116, a determination is made as to whether the distance to the center is less than to the vertices. If the DE2000 distance to the center of the chosen triangle is smaller than the distance to any of its vertices, the process assumes it has made a good choice and refines it using interval halving in act 130. Otherwise, it searches for a better one. It does this by, at act 122, searching the vertices of the triangles in the vicinity of the initial triangle, looking for the vertex with the smallest DE2000 distance. Then, in act 124, one is selected if with a smaller distance. It then searches the vertices in the vicinity of the initial minimum DE2000 distance vertex, looking for one with an even smaller distance. If it finds one, it repeats this step. This iteration is generally depicted as acts 122 and 124. If a smaller distance is not found, in act 126, the process calculates the average vertex distance for each of the triangles surrounding the vertex with the smallest distance, and in act 128, the process chooses the triangle with the smallest average distance as the center of a region that should contain the mapped color. This calculation will take the process to a good region of the gamut surface even if the first choice was not a very good one.

Now, in act 130, the process finds the mapped color in this region of the gamut surface. Per one embodiment, the mapped color may be found by function fitting followed by function inversion. However, because this distance is a very non-linear function of position on the gamut surface, the illustrated process uses an interval halving process. It begins by subdividing each triangle (solid lines in FIG. 2) in the vicinity of the original center (shaded) triangle 62 into 4 smaller triangles (dotted lines). It then calculates the distance to the new vertices and finds the average distance to each of the smaller triangles. It then picks the one with the smallest average distance to be the new center triangle 64, and forms a new smaller region (enclosed by the thicker line). It then iterates this procedure until the size of the central triangle falls below a threshold. The center point of this triangle is the desired mapped color.

Figure 5:
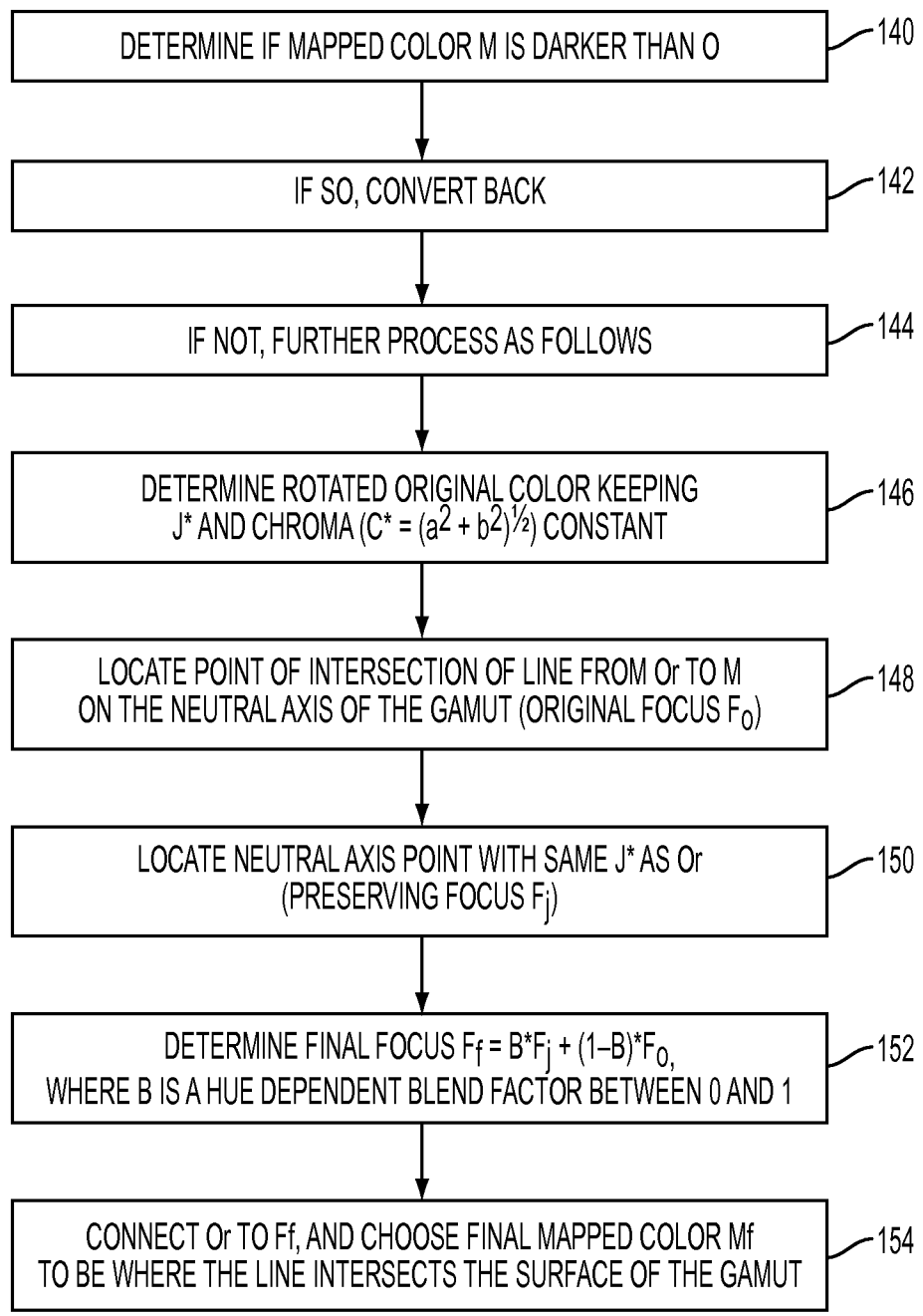
FIG. 5 is a flowchart of one embodiment of a process for a process for modifying a gamut map, to preserve J* dependent upon hue.

FIG. 5 is a flowchart of one embodiment of a process for a process for modifying a gamut map, to preserve J* dependent upon hue. Although the above process handles light colors very well, some extensions may be desired in order to improve results with dark colors. One problem is that in the dark brown region of color space, darker colors are often more saturated than lighter ones (brunette hair, for example). Therefore, they all can map to the same color on the gamut surface, and image detail is lost. An effective fix for this is J* preservation where the J* of the mapped color varies when the J* of the original color varies.

Using J* preservation for all dark colors, however, produces problems for very dark blues, which map to black. It would be better to map this color towards the lighter blue obtained by the original DE2000/CIECAM mapping. Both problems are solved by making the degree of J* preservation depend upon the hue. The use of this technique to extend the above-described DE2000/CIECAM gamut mapping process will be described below, though it can be used for any other gamut mapping process as well.

Figure 3:
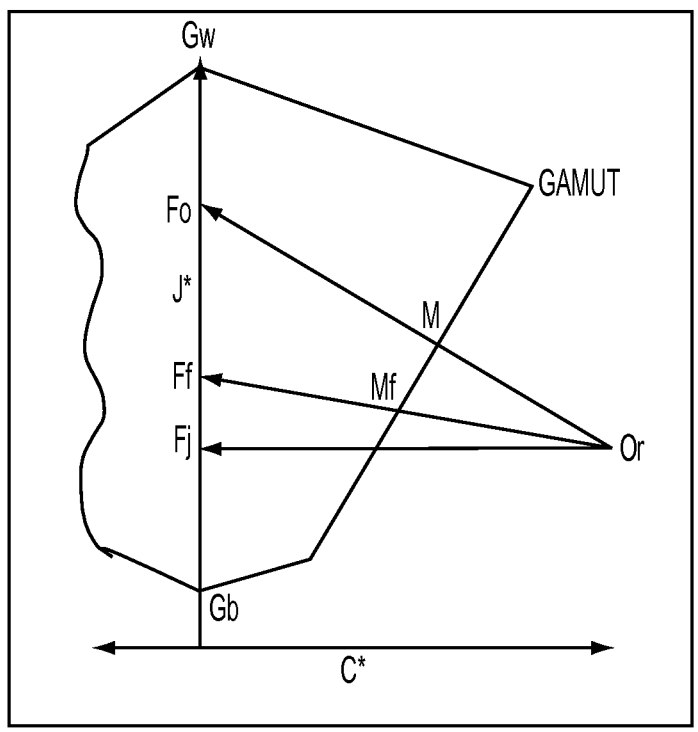
FIG. 3 shows a hue-based gamut, graphed in two dimensional space along C* (horizontal) and J* (vertical) axes.

This process involves several acts. See FIG. 3 which shows a hue-based gamut, graphed in two dimensional space along C* (horizontal) and J* (vertical) axes. The color to be mapped is converted to CIECAM space. Call this the original color (O). The gamut of the destination printer is also mapped to this space. The DE2000/CIECAM gamut mapping algorithm (or any other) as described above. Call this the mapped color (M).

In act 140, a determination is made as to whether M is darker than O. If so, in act 142, the process converts it back to the original color space. No further processing is needed. If M is lighter than O, as determined at act 144, O is in the dark region of the gamut, and further processing is needed.

In act 146, the original color is rotated to the hue plane of the mapped color, keeping J* and chroma $(C^*=(a^2+b^2)^{1/2})$ constant. This is called the rotated original color (Or). Then, in act 148, the process finds the point where a line from Or to M intersects the neutral axis of the gamut. This is called the original focus (Fo), this point is limited to lie between the white (Gw) and black (Gb) point of the printer gamut.

In act 150, the process picks a point on the neutral axis that has the same J* as the original point. This point is limited to lie between Gw and Gb. This is called the J* preserving focus (Fj). In act 152, Fj and Fo are blended to get the final focus (Ff) where Ff=B*Fj+(1−B)*Fo. B is the hue dependent blend factor which lies between 0 and 1.

In act 154, the process draws a ray between Or and Ff, and the final mapped color (Mf) is chosen to be where it intersects the surface of the gamut. The process then converts the mapped color from CIECAM to the original color space.

The claims as originally presented, and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. Apparatus, comprising:
    a color data conversion subsystem configured to convert input color data of an image in order to produce device dependent output color separation data tailored to given target rendering media, the color data conversion subsystem having been configured by gamut mapping including providing a gamut in a hue-based color space and applying color distance adjustments to the hue-based color space, wherein the hue-based color space includes J*a*b* CIECAM space, and wherein the adjustments involve using the hue-based color space values J*a*b* in the dE2000 distance formula as if they are L*a*b* values.

2. The apparatus according to claim 1, further comprising computer memory configured to hold stored representations of input color separation data.

3. The apparatus according to claim 2, wherein the input color separation data is configured for rendering media that is different than the given target rendering media.

4. The apparatus according to claim 3, wherein the input color separation data includes CMYK data.

5. The apparatus according to claim 1, further comprising computer memory configured to hold stored representations of device-dependent output color separation data for the image.

6. The apparatus according to claim 5, wherein the output color separation data is configured for the given target rendering media.

7. The apparatus according to claim 5, wherein the output color separation data is provided to a rendering engine.

8. The apparatus according to claim 7, wherein the output color separation data includes values for a given print engine.

9. The apparatus according to claim 8, wherein the output color separation data includes CMYK values for the given print engine.

10. The apparatus according to claim 8, further comprising the given print engine connected to the color data conversion subsystem.

11. The apparatus according to claim 1, further comprising one or more intermediate stages, wherein the color data conversion subsystem is configured to convert the color data in order to produce the device-dependent output color separation data indirectly via the one or more intermediate stages.

12. The apparatus according to claim 1, wherein the color data conversion subsystem includes an early stage device dependent to device independent color data converter.

13. The apparatus according to claim 12, wherein the early stage converter includes a set of one or more A2B tags.

14. The apparatus according to claim 13, wherein the set of A2B tags is configured to convert the input color separation data to profile connection space data.

15. The apparatus according to claim 14, wherein the profile connection space data includes L*a*b* CIELAB color space data.

16. The apparatus according to claim 12, further including a later stage device independent to device dependent color data converter.

17. The apparatus according to claim 16, wherein the later stage converter is connected in tandem with and downstream from the early stage converter.

18. Apparatus, comprising:
a color data conversion subsystem configured to convert input color data of an image in order to produce device dependent output color separation data tailored to given target rendering media, the color data conversion subsystem having been configured by gamut mapping including providing a gamut in a hue-based color space and performing lightness adjustments to the hue-based color space in order to preserve lightness information for select dark colors, wherein the hue-based color space is CIECAM J*a*b* color space, wherein the lightness adjustments are performed on J* values, and wherein select dark gamut-mapped colors are modified to be at or closer to pre-mapped versions of the same colors.

19. The apparatus according to claim 18, wherein a degree of the lightness adjustments is a function of hue.

\* \* \* \* \*